US012777131B1

(12) United States Patent
Jensen et al.

(10) Patent No.: US 12,777,131 B1
(45) Date of Patent: Oct. 27, 2026

(54) HYBRID IN-MEETING SURVIVABILITY SERVER

(71) Applicant: Zoom Video Communications, Inc., San Jose, CA (US)

(72) Inventors: Patrick John Jensen, Fresno, CA (US); Alexander Shneyderman, Wayne, NJ (US); Michael Adrian White, Alpine, UT (US)

(73) Assignee: Zoom Communication, Inc., San Jose, CA (US)

(*) Notice: Subject to any disclaimer, the term of this patent is extended or adjusted under 35 U.S.C. 154(b) by 187 days.

(21) Appl. No.: 18/646,318

(22) Filed: Apr. 25, 2024

(51) Int. Cl.
*H04N 7/15* (2006.01)
*H04N 7/14* (2006.01)

(52) U.S. Cl.
CPC ............. *H04N 7/157* (2013.01); *H04N 7/147* (2013.01); *H04N 7/152* (2013.01)

(58) Field of Classification Search
None
See application file for complete search history.

(56) References Cited

U.S. PATENT DOCUMENTS 8,281,017 B2 * 10/2012 Handa ................. H04L 65/1069 709/227
11,553,028 B1 * 1/2023 Evans ................. H04L 43/0811
2006/0077955 A1 * 4/2006 Poustchi ............... H04L 65/103 370/352
2011/0299387 A1 * 12/2011 Eydelman ............... H04L 45/22 370/225
2016/0027134 A1 * 1/2016 Alvarado ............ H04L 12/1818 705/311
2022/0174101 A1 * 6/2022 Ethier ................... H04L 65/611

* cited by examiner

*Primary Examiner* — Quoc D Tran
(74) *Attorney, Agent, or Firm* — Kilpatrick Townsend & Stockton LLP

(57) ABSTRACT

An example method for virtual meeting survivability includes hosting, by a survivability server, a virtual meeting for a first client device. Connecting to a virtual meeting provider using a network connection, where a second client device is connected to the virtual meeting via the virtual meeting provider, and in response to determining that the network connection between the survivability server and the virtual meeting provider has been interrupted, generating a local virtual meeting, and connecting the first client device to the local virtual meeting.

20 Claims, 10 Drawing Sheets

HYBRID IN-MEETING SURVIVABILITY SERVER

FIELD

The present disclosure relates generally to virtual conferencing, and more particularly to a hybrid in-meeting survivability server.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
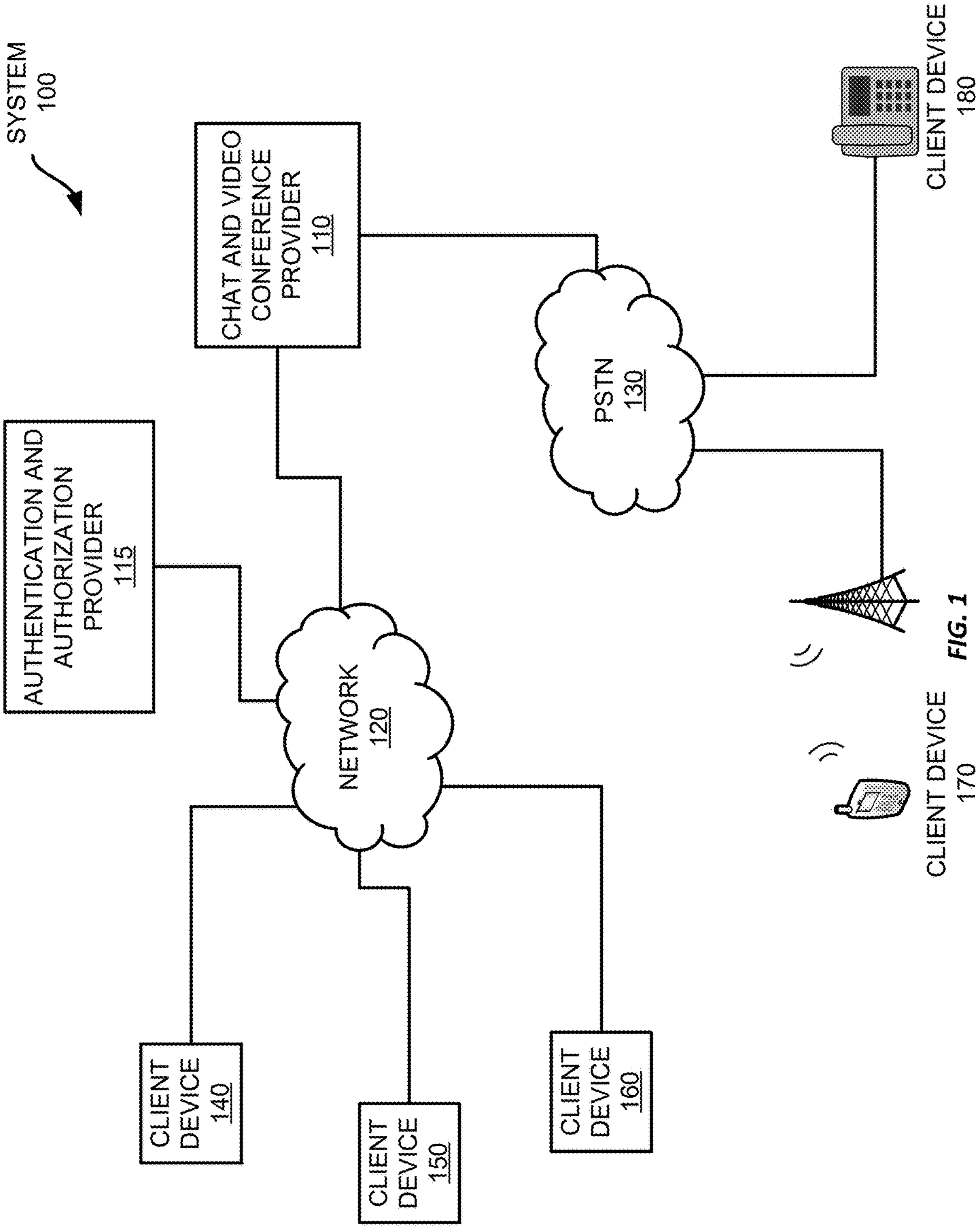
FIGS. 1-2 show example systems for providing hybrid in-meeting survivability.

Examples are described herein in the context of a hybrid in-meeting survivability server. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems are becoming more common vehicles to enable their users to create and attend videoconferences (or "virtual meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply socially and in business, and generally have a richer experience despite not being physically in the same space.

Typical virtual meetings may include dozens, and in some cases, up to thousands of participants exchanging video feeds at the same time. The virtual meetings may provide participating individuals with the opportunity to have focused discussions, create and manage group breakout rooms, and other functionalities to encourage and support collaboration. Usually, individuals connect to the virtual meeting in geographically distinct locations since it is difficult, if not impossible in some cases, to get each individual that wants to participate in the meeting into one location, especially in the case of thousands of participants attending the meeting. Virtual meetings also provide each individual with an opportunity to collaborate instantly, whereas if the meeting took place in a large building such as a convention center, there would be unavoidable delays in switching in between presenters.

However, there are unavoidable situations that may occur during virtual meetings that are attended by individuals physically located around the world. For example, in a virtual meeting hosted by a virtual conference provider, a network outage such as an internet disconnection affecting a private network in Seattle may affect some, but not all, participants participating in the virtual meeting around the world. In general, virtual conferences hosted by virtual conference providers the participants' client devices generating and transmitting video and audio streams to the virtual conference provider, whose infrastructure handles routing and distributing the received video and audio streams to the various participants in the virtual conference. Thus, an interruption of one or more client devices' network connectivity to the virtual conference provider prevents them from exchanging video and audio streams with other participants, and thereby effectively disconnects them from the virtual conference. Thus, in this example, the participants may be disconnected from the virtual conference provider due to the outage between the private network and the virtual conference provider, but may remain connected to their local private network. Meeting participants in other locations, such as in New York City, may not be affected by the network outage in Seattle and may remain connected to the virtual conference provider and can continue to collaborate in the meeting with any other connected participants, e.g., participants in London. However, this unavoidable disruption can negatively impact all participants of the virtual meeting and the overall quality of the meeting.

Creating a temporary local meeting using a local server for the affected participants in Seattle that were disconnected due to the unavoidable disruption can provide a medium for continued collaboration. This redundancy allows the participants in Seattle to remain connected to a virtual meeting, even though they are not able to contact the virtual conference provider. Remaining in a virtual meeting with the other participants from Seattle can provide an improved meeting experience since the affected participants may still want to continue to interact until the network connection may be restored to the virtual conference provider. If the network connection is restored between the affected participants in Seattle and the virtual conference provider, the local server may then reconnect the affected participants in Seattle back into the virtual meeting hosted by the virtual conference provider where they can resume participation in the virtual meeting.

In this way, the local server preserves the meeting experience for the affected participants, thereby improving the overall meeting experience for the affected participants. By utilizing a redundant server, meeting hosts can ensure important meeting topics and discussions can continue for participants in vulnerable regions, even if they are disconnected from the main portion of the virtual meeting due to a local internet outage. By way of example, vulnerable regions around the world that are susceptible to environmental hazards such as hurricanes or floods; or exist in a politically unstable climates can benefit from the advantages afforded by a dynamic virtual meeting. For example, safety and coordination crews in in northern Japan may work and coordinate with emergency services personnel in southern Japan via virtual conferencing to maintain communication lines after an earthquake event. During an aftershock event, network connections between southern Japan and the virtual conference provider may be disrupted, though northern Japan may remain connected. However, the emergency services personnel in southern Japan may continue to coordinate efforts using their local server functionality so that search and rescue efforts may continue unimpeded. Eventually the connection to the virtual conference provider may be restored and the safety and coordination crews may reconnect to the virtual meeting to continue to collaborate with the emergency services personnel with minimal loss in productivity.

This illustrative example is given to introduce the reader to the general subject matter discussed herein and the disclosure is not limited to this example. The following sections describe various additional non-limiting examples and examples of a hybrid in-meeting survivability server.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
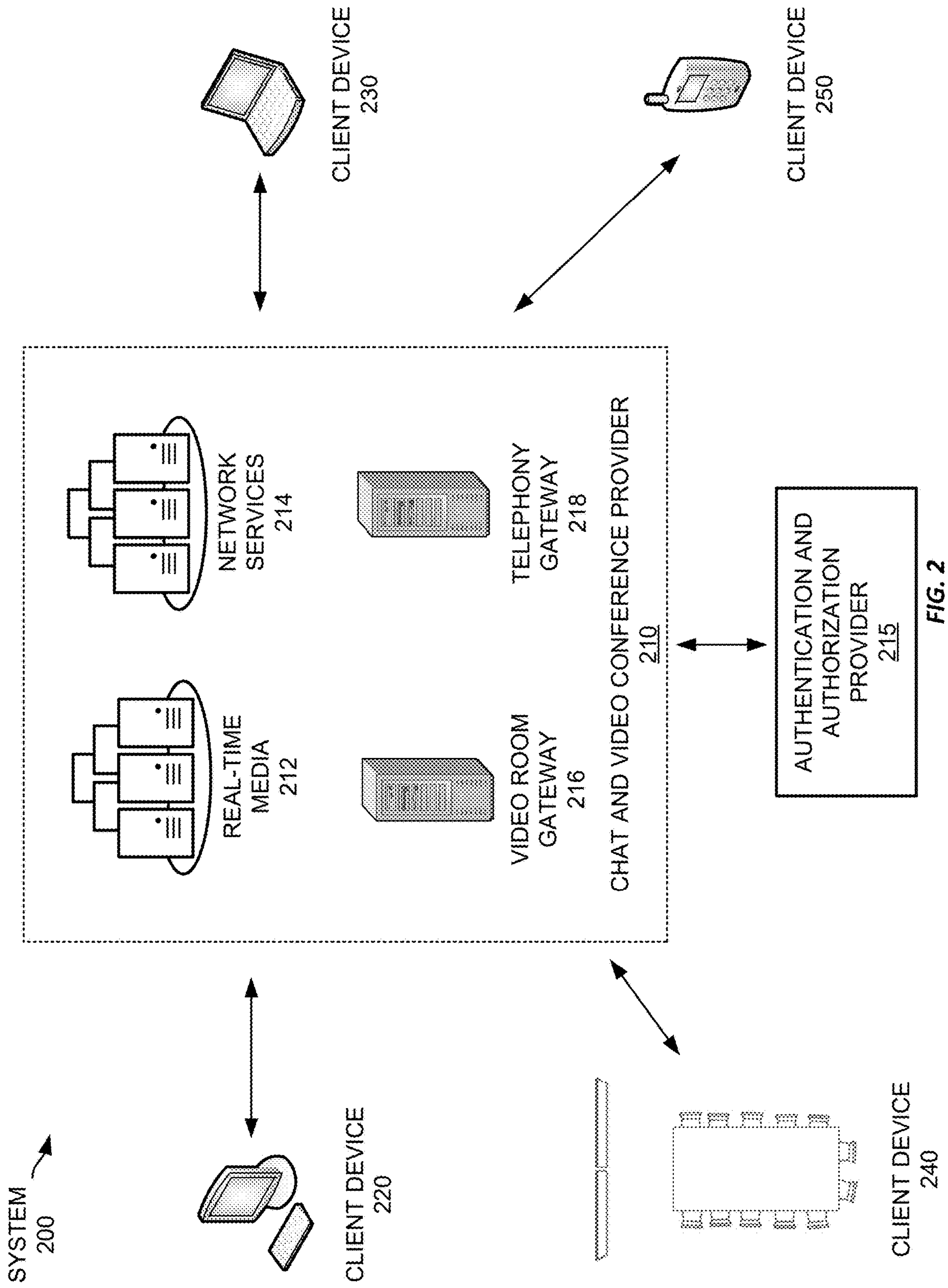

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In-Meeting Survivability

Figure 3:
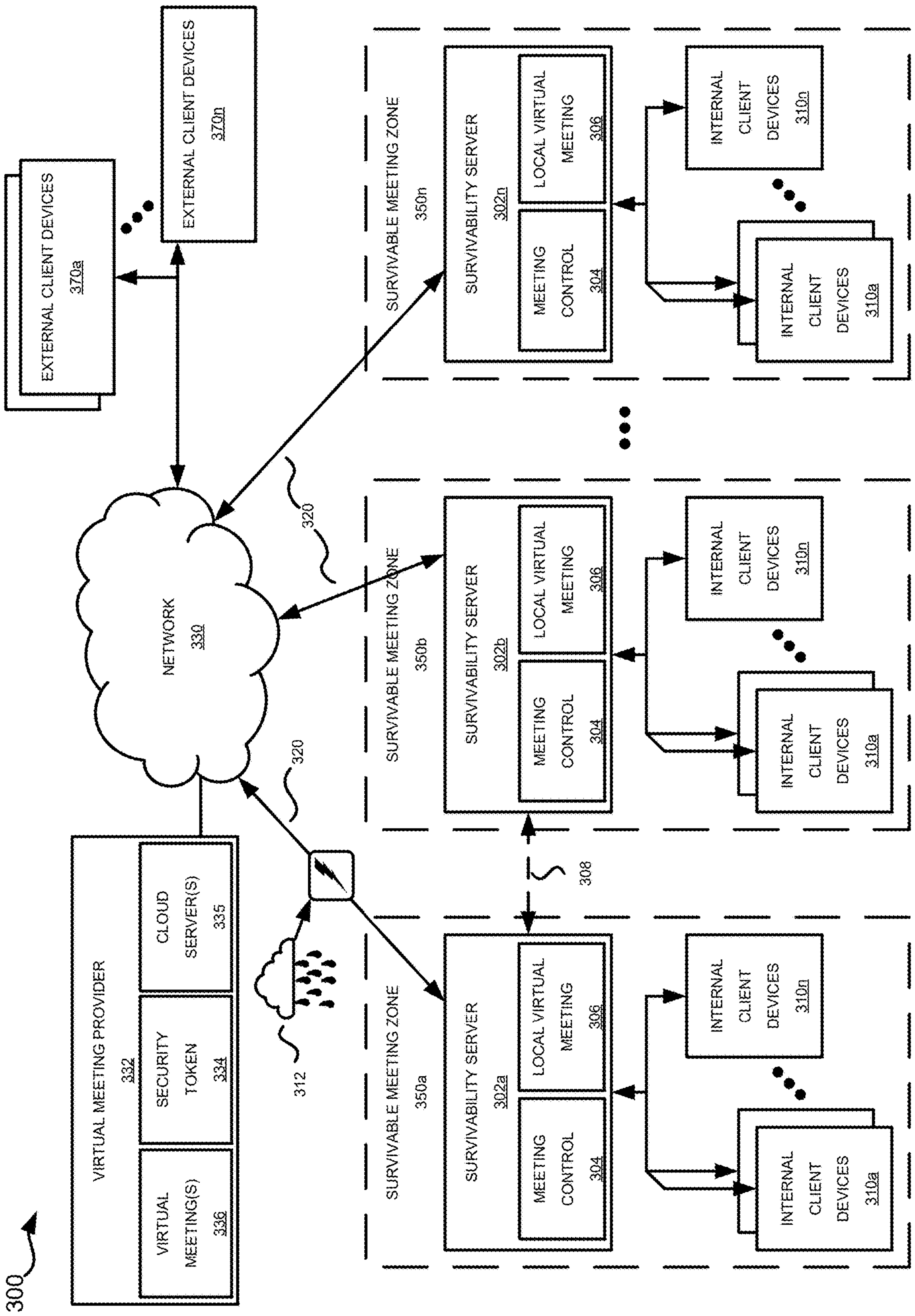
FIG. 3 shows an example system for providing hybrid in-meeting survivability.

Referring now to FIG. 3, FIG. 3 shows an example system 300 for providing meeting survivability using one or more hybrid in-meeting survivability servers 302*a*-302*n* (also referred to as "survivability server"), where n represents a number of survivability servers 302 connected in the system 300. The survivability servers 302 may be installed in various survivable meeting zones 350*a*-350*n*. Each survivable meeting zone 350 may represent a different location such as a room in a building, a campus, a city, a country, or a geographical region. As an example, survivable meeting zone 350*a* may be a geographical region near a commercial complex in Wilmington, North Carolina while survivable meeting zone 350*b* may include all of California.

A size of each survivable meeting zone 350 (e.g., number of connected devices or a real-world physical zone encapsulating connected devices) may be pre-determined or may be dynamically determined (based on network quality, ping, user defined, or similar). For example, the size of each survivable meeting zone 350 may be determined by network connection quality between dynamically determined groups of client devices 310*a*-310*n* in different regions. While configurations for one survivability server 302 are discussed herein for brevity, it should not be considered limiting and each survivability server 302*a*-302*n* should be considered to have some or all of the functionality of the discussed survivability server 302.

The survivability server 302 may connect (e.g., via LAN, WAN, or similar) to internal client devices 310 that may operate on a private network. While internal client devices 310 are referred to herein as "internal" or on a "private network", it should not be considered limiting in terms of a type of network they exist on but rather that each of the internal client devices 310 is served by the survivability server 302. The internal client devices 310 may include personal computers, smartphones, or any device that can connect participants to a virtual meeting 336 using a graphical user interface. A participant may use the internal client devices 310 to transmit a request to host the virtual meeting 336.

In some examples, the request to host a virtual meeting 336 is transmitted to the survivability server 302, which subsequently transmits the request to host the virtual meeting 336 to a network 330. In other examples, the request to host the virtual meeting 336 is transmitted directly to the network 330 which may work in conjunction with the survivability server 302 to set up the virtual meeting 336 using a virtual meeting provider 332.

The virtual meeting provider 332 may function similarly to the video conference provider 110, 210 as discussed above with respect to FIGS. 1 and 2. In at least one aspect, the virtual meeting provider 332 may function to host the virtual meeting 336 for the participants to join using the internal client devices 310. One or more cloud servers 335 may function to support or facilitate functions of the virtual meeting provider 332. The participants may connect to the virtual meeting 336 from some or all of the survivable meeting zones 350. In some examples, the network 330 may connect the survivable meeting zones 350 to the virtual meeting 336 so that participants that are dispersed from one another may join and participate in the virtual meeting 336.

The participants using the internal client devices 310 to connect to the virtual meeting 336 may share media content (e.g., audiovisual signals, streams, or similar) with one another over the network 330. Additionally, external devices 370*a*-370*n* may also share media content with the internal client devices 310 over the network 330 as well. In general, the network 330 enables participants to interact with each other within the virtual meeting 336.

The virtual meeting provider 332 may assign each survivability server 302 to a survivable meeting zone 350 or may assign groups of survivability servers 302 to a shared survivable meeting zone 350. In other examples, each survivability server 302 has a pre-defined survivable meeting zone 350 (e.g., a unique survivable meeting zone identification defined on installation). The internal client devices 310 may be assigned by the virtual meeting provider 332 or survivability server 302 to specific survivable meeting zones 350 depending on network quality, location, or participant preferences/settings to provide an improved meeting experience to the participant. In other examples, the internal client devices 310 may not be assigned to a specific survivable meeting zone 350 or a specific survivability server 302 until connection to the virtual meeting provider 332 is lost or by participant preference (e.g., a user choosing which region to connect to).

In some examples, when the survivability server 302 initially communicates with the virtual meeting provider 332, the survivability server 302 provides information to the virtual meeting provider 332 to register the survivability server 302 with the virtual meeting provider 332. Such information may include a LAN network address (e.g., an IP address, a server name, or similar); or information about the survivability server 302 (e.g., number of participants connected to the survivability server, location, device name, or similar). The survivability server 302 may also provide configuration information for one or more software components installed on the survivability server 302 to the virtual meeting provider 332. Such configuration information may enable the virtual meeting provider 332 to determine whether any configuration updates are needed and to provide such updates prior to, during, or after the virtual meeting 336.

The virtual meeting provider 332 may generate and provide one or more security tokens 334. In some examples, a security token 334 (e.g., an authentication key, security privileges, or similar) may be provided to the survivability server 302. In other examples, a security token 334 is provided directly to internal client devices 310 to ensure proper authentication and permissions between the internal client devices 310, the virtual meeting provider 332, and the survivability server 302. During the virtual meeting 336, the internal client devices 310 may maintain awareness (e.g., connectivity, meeting status, or similar) of the survivability server 302 and the virtual meeting provider 332. Similarly, the survivability server 302 may transmit similar information (authentication keys, security privileges, or similar) to the virtual meeting provider 332.

When the virtual meeting provider 332 receives the information from the survivability server 302, it establishes a record in a database for the survivability server 302. The virtual meeting provider 332 may then generate a security token for the survivability server 302, which can be used by the survivability server 302 to identify itself to the video meeting provider 332. Any suitable type of security token may be used according to different examples, e.g., a verifiable procedurally generated alphanumeric sequence (such as may be used for product activation of consumer software) or a cryptographic key of a key-pair assigned to the survivability server 302 by the video meeting provider 332. The survivability server 302 then updates the record to include the security token and some or all of the information received from the survivability server 302, such as its LAN network address, its LAN network name, configuration information, etc.

In addition, the virtual meeting provider 332 may obtain other information from the survivability server 302, such as its WAN network address, e.g., based on inbound network packets received from the survivability server 302. Such information may then be stored in a corresponding record (or records) in the database. The virtual meeting provider 332 then responds to the survivability server 302 with the security token and any updates, if needed, and then indicates that the survivability server 302 has been registered and may begin waiting for meeting requests from internal client devices 310.

Once the survivability server 302 is configured and registered with the virtual meeting provider 332, internal client devices 310 may discover the survivability server 302 and access the virtual meeting 336 using it. Discovery may be accomplished by communicating with the virtual meeting provider 332, such as by accessing a URL that identifies the virtual meeting provider 332, which may then provide information about the survivability server 302 to the requesting the internal client device 310. In some examples, client devices may be configured to transmit network communications onto a LAN to request a response from any survivability server(s) 302_a_-302_n_ that may be connected to it, e.g., by using a multi-cast protocol. Other example LANs may employ a name service, e.g., domain name service ("DNS"), that may allow internal client devices 310 to search for survivability servers 302 by name within the LAN. Using one or more of these techniques, internal client devices 310 may be able to discover an available survivability server 302 on a LAN. In some aspects, the internal client devices 310 are notified that a better survivability server 302 is available for connection (e.g., a server with more available seats or better ping).

In some examples, the internal client devices 310 may be connected to the survivability server 302 by a wired or wireless connection. The internal client devices 310 may transmit and receive signals over a pre-defined private network (e.g., organization specific network). For example, the internal client devices 310 that have pre-existing accounts and credentials (e.g., account, password, permissions) may be considered "internal" or "in-network" client devices 310. The private network may connect the internal client devices 310 to the virtual meeting provider 332 via network 330. The internal client devices 310 may provide the proper authentication to the virtual meeting provider 332 to receive access to the virtual meeting 336. Once the internal client devices 310 join the virtual meeting 336, the internal client devices 310 may transmit and receive audio-visual signals across the network connection 320 to share content streams (e.g., audio, visual, text) with other internal client devices 310 connected to the virtual meeting 336.

An example survivability server 302 includes a meeting control software component 304 that receives requests from internal client devices 310, e.g., client devices 310_a-n_, coordinates meetings with the virtual meeting provider 332, and may establish, manage, and tear-down meetings. In addition, the survivability server 302 may host any number of simultaneous meetings depending on numbers of participants on the private network and computing resources. In some examples, the survivability server 302 may be configured with limits, such as on the aggregate total number of simultaneous participants across all hosted virtual meetings 336 or on the total number of simultaneous virtual meetings 336.

The meeting control software component 304 receives requests from client devices to host or join meetings and either creates a new meeting, in response to a request to host a meeting, or determines whether participant may join an existing meeting and, if so, provides access information to the existing meeting, which the client device can then join. In addition, when a new meeting is created, the meeting control software component 304 may instantiate a new instance of a meeting control software component 304 to manage the new meeting. It should be appreciated that while multiple meetings may be hosted, it does not necessarily require that multiple meeting control software components 304 be installed on the survivability server 302. Rather, in some examples, a single copy of a meeting control software component 304 may be installed and executed or instantiated multiple times to provide for multiple simultaneous meetings.

Still further variations may be employed. For example, a single copy of a meeting control software component 304 may be executed once and may create and manage all meetings handled by the survivability server 302. When new meetings are created, the meeting control software component 304 communicates with the virtual meeting provider 332 via the network 330 to indicate that a new meeting has been created, to provide the access information to the meeting, such as a meeting identifier and passcode, and to provide other information about the meeting, such as the scheduled time and duration for the meeting, the maximum number of participants, the invited participants, etc.

In some examples, however, the meeting control software component 304 may receive such meeting information from the virtual meeting provider 332. For example, if a meeting host has scheduled a meeting in advance with the virtual meeting provider 332, and subsequently accesses the survivability server 302 to host the meeting, the survivability server 302 may request meeting information from the virtual meeting provider 332, such as the meeting identifier and passcode, participant information (e.g., an invitation list), scheduled time and duration, etc. Thus, either the survivability server 302 or the virtual meeting provider 332 may obtain the initial meeting configuration and subsequently provide it to the other entity, depending on the sequence by which the virtual meeting 336 was initially scheduled or created.

To begin a virtual meeting 336, as mentioned above, the meeting control software component 304 instantiates a meeting which includes functionality to admit participants, receive and provide multimedia streams, create breakout rooms, record the meeting, etc., and other meeting-related functionality generally as described above with respect to FIGS. 1 and 2. Thus, the survivability server 302 may function in collaboration with the virtual meeting provider 332 and provide some or all of the same meeting functionality that meetings hosted by the virtual meeting provider 332 itself would provide.

In addition, the survivability server 302 may simultaneously host multiple meetings. For example, a convention center may simultaneously host multiple different conferences, each of which may employ video conferencing functionality and thus may use an available survivability server 302 to host the various meetings. Each meeting may be created and managed generally as discussed above and while multiple meetings may be hosted by a single survivability server 302, each virtual meeting 336 remains separate and distinct from every other virtual meeting 336. Thus, meeting participants may be prevented from accessing meetings to which they have not been invited.

When a participant, via an internal client device 310, e.g., client devices 310*a-n* attempts to join a meeting hosted by the survivability server 302, the survivability server 302 may attempt to authenticate the new participant generally as discussed above and with respect to FIGS. 1 and 2. In some examples, the survivability server 302 may communicate with the video conference provider to determine whether the participant has been invited to the meeting and is actually the participant they purport to be. For example, the survivability server 302 may communicate with a user identity provider, e.g., user identity provider, or the virtual meeting provider 332 to authenticate a participant. Once a participant has been authenticated to join a requested meeting, the meeting control software component 304 may provide access information for the meeting via the LAN, such as access information to obtain one or more multimedia streams from the meeting and to provide multimedia streams to the meeting.

During the course of a virtual meeting 336, the meeting software components may receive and provide multimedia streams to the various participants via the LAN using techniques generally as described above with respect to FIGS. 1 and 2. In some examples, one or more participants may join the virtual meeting 336 hosted by the survivability server 302 but are not connected to the LAN. In such examples, the virtual meeting provider 332 may accept meeting connections from such external client devices 370*a-n* and coordinate with the survivability server 302 to obtain certain multimedia streams from the meeting. For example, the survivability server 302 may receive a notification from the virtual meeting provider 332 identifying one or more external client devices 370 and a request for one or more multimedia streams for the meeting. The survivability server 302 may then identify one or more multimedia streams to provide to the external clients 370 via the virtual meeting provider 332. For example, the survivability server 302 may select multimedia streams sent by the meeting host and by the participant who is currently speaking or presenting.

In addition, the survivability server 302 may indicate to the virtual meeting provider 332 whether any multimedia streams from the external clients 370 should be provided to the survivability server 302. In some examples, the virtual meeting provider 332 may provide multimedia stream information to the survivability server 302 to enable the survivability server 302 to access multimedia streams from the external clients 370. However, the virtual meeting provider 332 may not provide such multimedia streams unless the survivability server 302 specifically requests such multimedia streams (also referred to as "subscribing" to a multimedia stream). If the survivability server 302 does not subscribe to an external client's multimedia stream, the virtual meeting provider 332, in this example, does not transmit the multimedia stream to the survivability server 302 to reduce traffic and network load. To assist the survivability server 302 in determining whether to subscribe to an external client's multimedia stream(s), the virtual meeting provider 332 may provide an indication to the survivability server 302 if a participant connected via the external client device 370 begins talking or presenting content, e.g., presentation slides. In such an example, the survivability server 302 (e.g., a corresponding meeting hosted by the survivability server 302) may determine to subscribe to the external client devices 370 multimedia streams and receive those multimedia streams to be provided to the internal client devices 310 connected to the LAN.

The survivability server 302 includes a single computing device that includes the various software components discussed above. However, it should be appreciated that the survivability server 302 may employ multiple computing devices. For example, the survivability server 302 may employ one computing device to execute a meeting control software component 304 and one or more additional computing devices to execute meeting software components to host individual meetings. Examples with multiple different computing devices may enable the use of relatively inexpensive computing devices to host meetings or to dedicate a computing device to handle a meeting with a large number of participants. Still other configurations are contemplated within the scope of this disclosure.

Regarding some additional aspects of meeting survivability, prior to hosting and joining the virtual meeting 336, a first participant, e.g., the host of the virtual meeting, may use the internal client device 310 to set the virtual meeting 336 as survivable. For example, the survivability server 302 may receive the survivable configuration from the internal client device 310 or from the virtual meeting provider 332 and determine if at least some connected internal client devices 310 should be able to continue in at least one meeting format (e.g., a new temporary local virtual meeting) during an interruption event 312 (e.g., power outage, network connection loss, or similar) that may disrupt the network connection 320.

The survivability server 302 may monitor the network connection 320 to the virtual meeting provider 332 continuously in real time or periodically (e.g., every a few milliseconds to a few seconds or more). In some aspects, during the virtual meeting 336 while participants are collaborating, the survivability server 302 may determine if the network interruption 312 has occurred or is about to occur. For example, the survivability server 302 may monitor a ping from the virtual meeting provider 332. If the ping begins to grow, such as from twenty milliseconds to one-hundred milliseconds within a pre-determined time threshold (e.g., five to ten seconds), the survivability server 302 may determine that the network connection 320 is failing but has not yet failed. In this example, the survivability server 302 may notify the internal client device 310 that the network connection 320 is failing (e.g., via pop-up alert, via push notification, or similar) and that the local virtual meeting 306 may be created shortly in the event of network connection 320 failing.

In other examples, the survivability server 302 may experience an immediate and spontaneous (e.g., less than a millisecond) disconnection from the virtual meeting provider 332. In this instance, the survivability server 302 may determine that the network connection 320 has been severed by the interruption event 312 and generate a local virtual meeting 306. Subsequently, the survivability server 302 may provide information (e.g., meeting address, authentication, privileges, security tokens, or similar) to the internal client device 310 to connect to the local virtual meeting 306. In at least one example, the survivability server 302 may not notify the internal client device 310 that the interruption event 312 has occurred prior to transitioning the internal client device 310 into the local virtual meeting 306. Instead, the survivability server 302 may connect at least the internal client device 310 into the local virtual meeting 306 and then notify the internal client device 310 that the internal client device 310 has been connected to the local virtual meeting 306 in response to the interruption event 312. This may ensure a seamless transition for affected participants currently engaged with one another. In some aspects, all affected internal client devices 310 that have been connected to the local virtual meeting 306 are notified about the interruption event 312 and the transition to the local virtual meeting 306.

During interruption events 312, not all internal client devices 310 across all survivable meeting zones 350 may be disconnected from the virtual meeting 336 hosted by the virtual meeting provider 332. In some examples, only a specific survivable meeting zone 350, such as survivable meeting zone 350*a*, may have been affected by the interruption event 312. In this example, internal client devices 310 that are within survivable meeting zone 350*b* may be unaffected and may continue to participate in the virtual meeting 336 hosted by the virtual meeting provider 332 while internal client devices 310 that are in survivable meeting zone 350*a* may not be able to continue in the virtual meeting 336. During this interruption event 312, the virtual meeting 336 may persist for internal client devices 310 in survivable meeting zone 350*b*. The virtual meeting provider 332 may notify (e.g., via pop-up, via push notification, or similar) the internal client devices 310 in all remaining connected survivable meeting zones 350*b*-350*n* that a number of internal client devices 310 in survivable meeting zone 350*a* have disconnected from the virtual meeting 336.

In some examples, internal client devices 310 in survivable meeting zone 350*a* that have been disconnected from the virtual meeting provider 332 may search for an alternate survivability server 302, such as survivability server 302*b*, that is still connected to the virtual meeting provider 332 by way of an alternate network connection 308, e.g., a different network route that bypasses the network outage on the network connection 320 affected by the interruption event 312. If the alternate survivability server 302*b* is determined to still be connected to the virtual meeting provider 332, the internal client devices 310 in survivable meeting zone 350*a* may attempt to reconnect to the virtual meeting 336 using the alternate survivability server 302*b* by way of the alternate network connection 308.

In another example, the survivability server 302 may determine that the network connection 320 to the virtual meeting provider 332 has been restored. The survivability server 302 may wait a pre-determined time period based on a timeout threshold (e.g., a few seconds to a few minutes) to determine if the network connection 320 is stable enough to reconnect the internal client devices 310 to the virtual meeting provider 332 where the previous virtual meeting 336 is still in-progress. In another example, while the network connection 320 may have been restored, the survivability server 302 may determine that the virtual meeting 336 has ended. In this event, the survivability server 302 may notify the internal client devices 310 that the virtual meeting 336 has ended. Alternatively, the survivability server 302 may receive an acknowledgement from the virtual meeting provider 332 that the network connection 320 has been restored and it is safe for all internal client devices 310 to rejoin the virtual meeting 336. In this example, the survivability server 302 may reconnect all internal client devices 310 from the local virtual meeting 306 to the virtual meeting 336. In some examples, the internal client devices 310 may be notified that the network connection 320 has been restored and may individually re-connect to the virtual meeting 336.

In some aspects, after the survivability server 302 has created the local virtual meeting 306 and facilitated transitioning the internal client devices 310 into the local virtual meeting 306, the survivability server 302 may monitor a candidate list of external servers capable of continuing the virtual meeting 336 (e.g., cloud or non-cloud servers that were engaged in the virtual meeting prior to disconnection, but may not have a survivability server). This occurrence where multiple survivable meeting zones 350 have been disconnected due to one or more related or unrelated interruption event(s) 312 can result in multiple survivability servers 302 instantiating local virtual meetings 306. Due to timing constraints with launching the local virtual meetings 306 for the internal client devices 310 connected to survivability servers 302, one survivability server 302 may determine if another survivability server 302 was disconnected from the virtual meeting 336 as well.

For example, a network in Houston and a network in Dallas may connect to a network in Los Angeles to collaborate in a virtual meeting 336, each having an external server and one or more survivability servers 302. An interruption event 312 may occur that disrupts Houston first, subsequently disconnecting Houston from both Los Angeles and Dallas. After a few seconds or a few minutes, the network in Dallas may experience the same interruption event 312. The network in Houston may have already instantiated the local virtual meeting 306 at this time and make a decision to incorporate the network in Dallas into the local virtual meeting 306. This may improve the experience of participants in both Houston and Dallas by increasing the number of participants that were previously orphaned into a larger meeting until the network in Los Angeles can be reconnected to.

In addition, the external servers may not have direct access to the virtual meeting 336; but may have additional participants that have been orphaned. In this example, the survivability server 302 may identify a stable connection to an external server within the candidate list of external servers and connect to the external server. The survivability server 302 may notify the internal client devices 310 that the survivability server 302 is going to merge the local virtual meeting 306 with participants connected to the external server into a second virtual meeting that includes participants from both the local virtual meeting 306 and participants connected to the external server. In at least one example, the external server may have external client devices 370 connected and awaiting reconnection to the virtual meeting 336.

In some examples, the survivability server 302 may determine that the network connection 320 to the virtual meeting provider 332 is no longer interrupted after forming the second virtual meeting. The survivability server 302 may connect to the virtual meeting provider 332 to access the virtual meeting 336 and merge the second meeting with the virtual meeting 336 to combine all participants.

Figure 4:
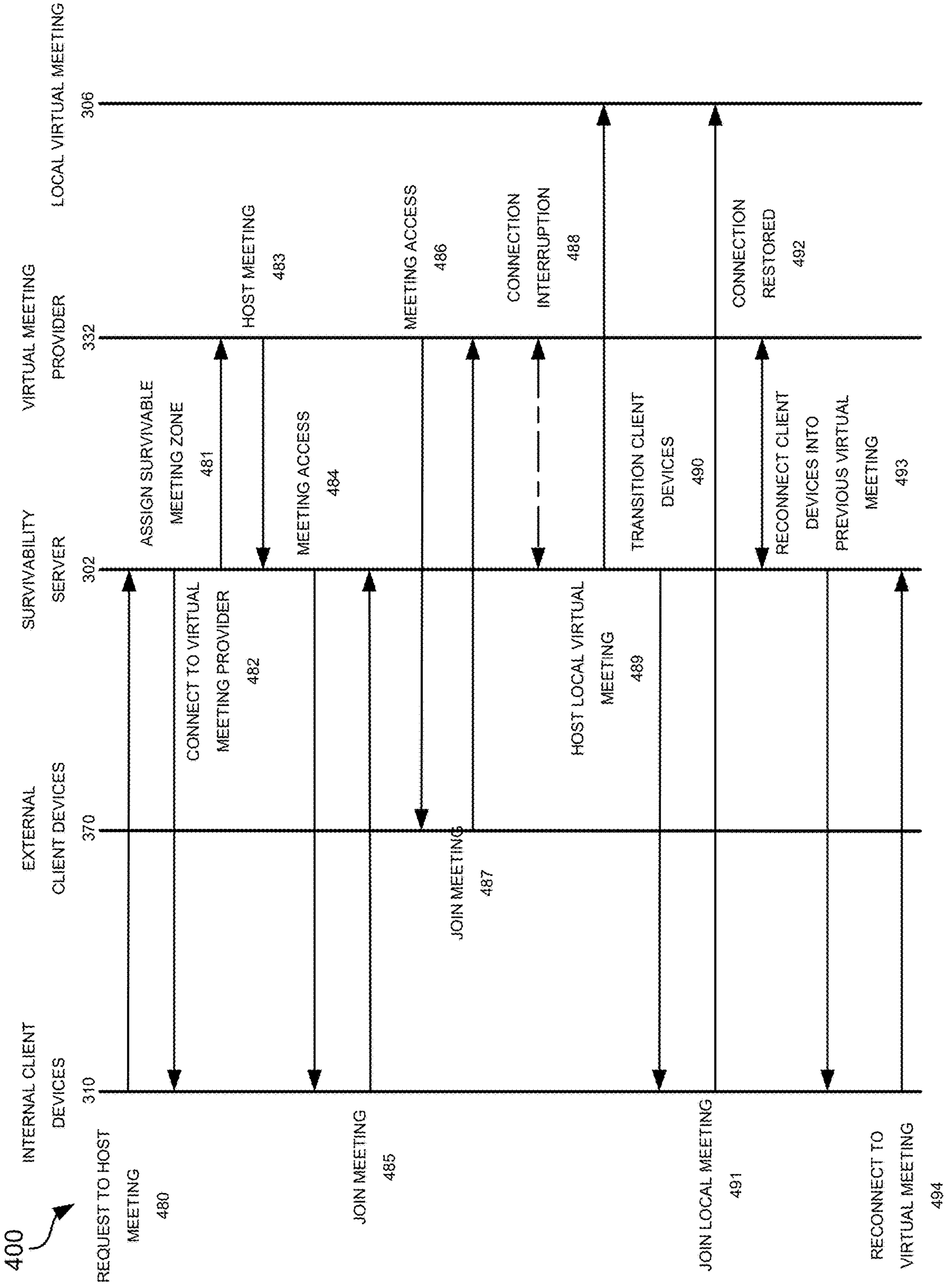
FIG. 4 shows an example sequence diagram for hybrid in-meeting survivability.

Referring now to FIG. 4, while references will be made to specific components of the examples system shown in FIG. 3, it should be appreciated that the example shown in FIG. 4 is compatible with any example described herein. FIG. 4 shows an example sequence diagram 400 for internal client devices 310. The sequence diagram illustrates an example sequence of events leading up to and occurring after an interruption event 312 during a virtual meeting 336 that is in-progress.

A first client device 310 of internal client devices 310 (e.g., client devices that communicate over an internal network such as a LAN/WAN or similar) initially submits a request 480 to host a virtual meeting 336 to the survivability server 302 that may be joined by other internal client devices 310 and external client devices 370 (e.g., client devices that communicate over an external network such as the internet or similar). The request 480 to host the virtual meeting 336 may include metadata related to the client device 410 including login credentials (e.g., account name, password, host key, or similar), meeting settings (e.g., survivability, video, audio, or similar), and similar parameters.

The survivability server 302 may assign 481 a survivable meeting zone 350 to the first client device 310 upon receiving the request 480 to host the virtual meeting 336. In addition, the survivability server 302 may relay the request 480 to host the virtual meeting 336 upon connecting 482 to a virtual meeting provider 332. In some alternative examples, the virtual meeting provider 332 may assign 481 the survivable meeting zone 350 to the survivability server 302 and group some or all connected internal client devices 310 to the same survivable meeting zone 350 with the survivability server 302.

The virtual meeting provider 332 may verify the metadata by authenticating the first client device 310 using the authentication and authorization provider 115 described in the systems and methods of FIGS. 1-3. After authenticating the first client device 310, the virtual meeting provider 332 may utilize a virtual meeting provider 332 to host 483 the virtual meeting 336 for the survivability server 302 and first client device 310.

In some examples, the survivability server 302 relays meeting access 484 to the first client device 310 which enables the first client device 310 to join 485 the virtual meeting 336. Either simultaneously or in short succession (e.g., within a few seconds or a few minutes) of the virtual meeting 336 being hosted, the virtual meeting provider 332 may provide meeting access 486 to some or all internal client devices 310 and external client devices 370. Once the external client devices 370 have meeting access 486, the external client devices 370 may join 487 the virtual meeting 336 to participate with the internal client devices 310 and other external client devices 370.

While the virtual meeting 336 is in-progress, an interruption event 316 (e.g., network outage or similar) may occur that can cause a connection interruption 488 between the survivability server 302 and the virtual meeting provider 332. The connection interruption 488 may cause some or all internal client devices 310 connected to the virtual meeting 336 to be removed from the virtual meeting 336. On removal from the virtual meeting 336, the internal client devices 310 may be notified (e.g., pop-up notification) by the survivability server 302 that the connection to the virtual meeting provider 332 has been severed.

In some examples, the external client devices 370 are notified of a degraded virtual meeting experience (e.g., some participants disconnected) when the virtual meeting provider 332 determines that several participants (e.g., one or more disconnected participants) have been unexpectedly disconnected from the virtual meeting 336. After the interruption event 316, the survivability server 302 may attempt to contact the virtual meeting provider 332 in order to re-establish a connection.

While the survivability server 302 continues to attempt to re-establish the connection to the virtual meeting provider 332, the survivability server 302 may host 489 a local virtual meeting 306 based on various factors such as disconnection period (e.g., network disconnection has persisted for a few seconds to a few minutes), survivability status (e.g., the virtual meeting 336 was set as survivable by the host), or similar.

Once the local virtual meeting 306 has been hosted by the survivability server 302, the survivability server 302 may transition 490 the internal client devices 310 that were disconnected from the virtual meeting 336 into the local virtual meeting 306. Prior to or during the transition 490, the survivability server 302 may notify the internal client devices 310 that the transition 490 is about to occur.

In at least one aspect, once the transition 490 is underway, the internal client devices 310 that were disconnected are subsequently able to join 491 into the local virtual meeting 306. In some examples, the internal client devices 310 may request to join 491 the local virtual meeting 306 or may be automatically joined into local virtual meeting 306 by the survivability server 302. In other examples, only a subset of the internal client devices 310 may be transitioned into the local virtual meeting 306 based on pre-defined parameters such as participant defined permissions or host settings.

The transition 490 may be seamless (e.g., without participants seeing a difference in some or all of the graphical user interface) or provided with a transition splash screen or other notification. The transition 490 may be participant defined and unique to each internal client device 310. For example, the internal client device 310 may have the transition 490 set to "automatic" while a second internal client device 310, such as internal client device 310*b*, may have the transition 490 set to "ask before joining".

In some examples, the network connection 320 may be restored 492 and the survivability server 302 may re-establish communication with the virtual meeting provider 332 and the virtual meeting provider 332. The survivability server 302 may notify the internal client devices 310 that the connection has been restored 492 and that the internal client devices 310 are about to be reconnected to the previous virtual meeting 493. For example, the survivability server 302 may push the notification, "Connection to previous meeting has been restored. Reconnection in progress" to some or all of the internal client devices 310.

The survivability server 302 may use the techniques described in FIG. 3 to determine if the network connection 320 is stable enough to reconnect the internal client devices 310. If the network connection 320 is determined to be stable, the survivability server 302 reconnects 494 to the virtual meeting 336 and subsequently begins to reconnect the internal client devices 310 to the virtual meeting 336. The reconnections may be simultaneous or intermittent. For example, in a situation where the network connection 320 may be susceptible to load limits or is degraded due to the interruption event 312, it may be beneficial to reconnect small groups (e.g., a few client devices to a few thousand client devices) of the internal client devices 310 at a time.

Figure 5:
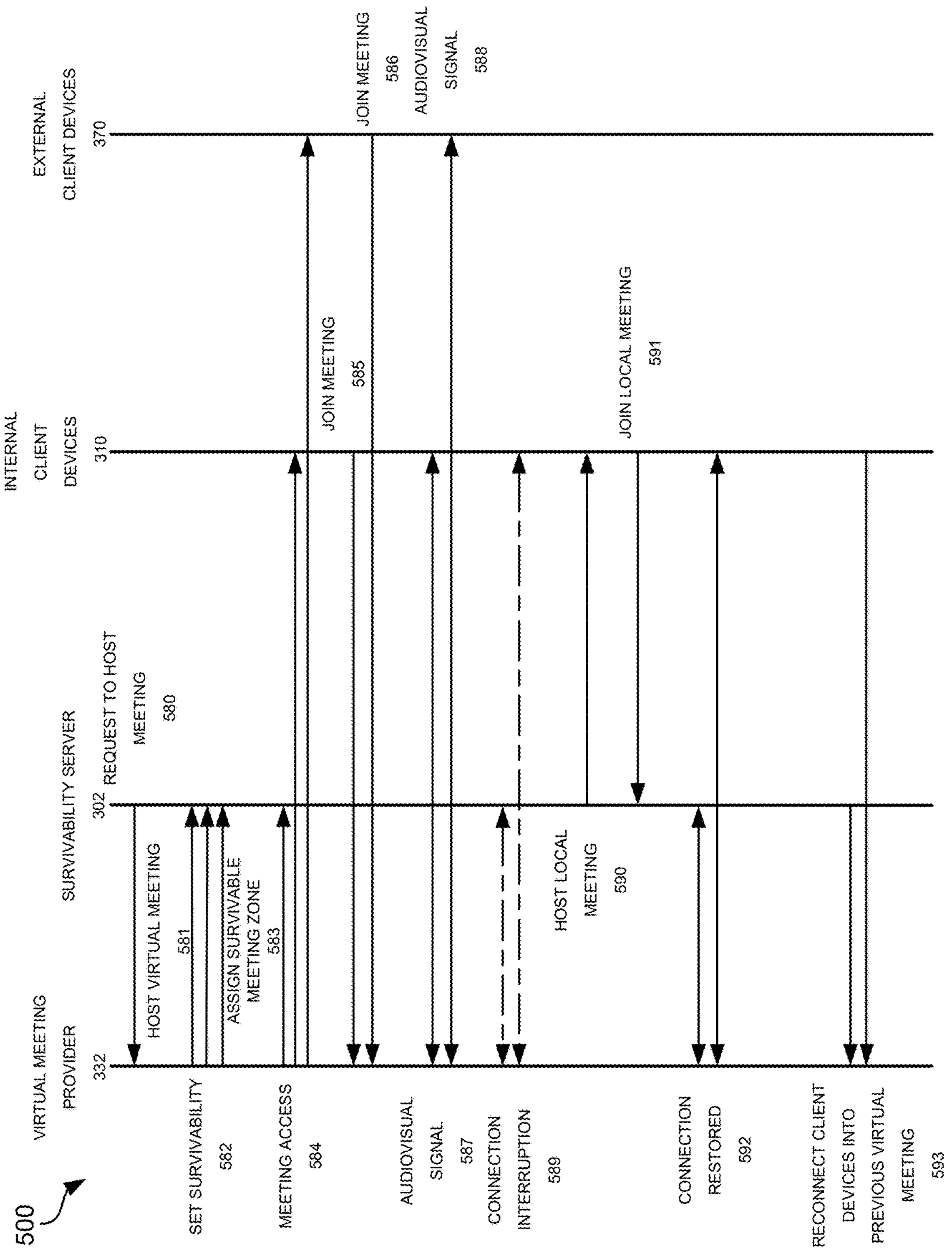
FIG. 5 shows an example sequence diagram for hybrid in-meeting survivability.

Referring now to FIG. 5, while references will be made to specific components of the examples system shown in FIG. 3, it should be appreciated that the example shown in FIG. 5 is compatible with any example described herein. FIG. 5 shows an example sequence diagram 500 for a virtual meeting provider 332 hosting a virtual meeting provider 332. The sequence diagram illustrates an example sequence of events leading up to and occurring after an interruption event 312 which causes a connection interruption during a virtual meeting 336 that is in-progress.

In some examples, the virtual meeting provider 332 receives a request 580 to host a virtual meeting 336 for internal client devices 310 and external client devices 370 from the survivability server 302. Upon receiving the request 580, authentication may be performed by the virtual meeting provider 332. If the authentication is valid, the virtual meeting provider 332 hosts 581 the virtual meeting 336. In addition, the virtual meeting provider 332 determines if a meeting survivability has been set (e.g., as discussed above with respect to FIG. 3) by either the survivability server 302 or a client device.

The virtual meeting provider 332 may communicate to the survivability server 302 whether or not the virtual meeting 336 should be set 582 as survivable if a network connection 320 is disconnected. Additionally, the virtual meeting provider 332 may assign 583 a survivable meeting zone 350 to the survivability server 302. The virtual meeting provider 332 may provide meeting access 584 to the survivability server 302, internal client devices 310, and the external clients 370.

After gaining meeting access 584, the internal client devices 310 may join 585 the virtual meeting 336. Additionally, after gaining meeting access 586 from the virtual meeting provider 332 the external client devices 370 may join as well. Once the internal client devices 310 have joined 585 the virtual meeting 336, the internal client devices 310 may send and receive audiovisual signals 587 between each other. Similarly, once the external client devices 370 have joined the virtual meeting 336, the external client devices 370 may send and receive audiovisual signals 587 with each other and the internal client devices 310.

While the virtual meeting 336 is in-progress, a connection interruption 589 may occur which severs a network connection 320 between the virtual meeting provider 332 and the internal client devices 310 and the survivability server 302. During the connection interruption 589, the survivability server 302 may automatically host 590 a local virtual meeting 306 for the internal client devices 310 that were orphaned by the connection interruption 589. Once the local virtual meeting 306 is hosted, the internal client devices 310 may join 591 based on priority, participant preferences (e.g., whether or not a participant wants to join), or pre-defined permissions (e.g., host defined permissions, software subscriptions, or similar).

After some time (e.g., from seconds to hours), a connection may be restored 592 between the internal client devices 310, the survivability server 302, and the virtual meeting provider 332. Once the connection is restored 592, the survivability server 302 may use the techniques described above in FIG. 3 to begin reconnecting 593 the internal client devices into the previous virtual meeting 336.

For example, some of the internal client devices 310 may have a higher priority for continuing within the local virtual meeting 306 than other internal client devices 310. Priorities may be determined by the survivability server 302 or may be defined by the internal client devices 310. Priorities may be based on an organizational structure such as a relative job positions (e.g., manager, IT staff, or similar) or may be based on determining which internal client devices 310 are required to stay in the local virtual meeting 306 (e.g., a situation where only one participant has the pre-requisite subscription to ensure meeting survivability for one or more other client devices).

During the connection interruption 589, the virtual meeting provider 332 may determine how many survivability servers 302 and internal client devices 310 have been disconnected. The virtual meeting provider 332 may ping (e.g., an echo request or similar) all available survivability servers 302 to determine how many are still connected to the virtual meeting provider 332. In one example, if the virtual meeting provider 332 determines that all survivability servers 302 have been disconnected, the virtual meeting provider 332 may end the virtual meeting 336 to save resources and bandwidth. In other examples, the virtual meeting provider 332 will continue to service the virtual meeting provider 332 for a time period (e.g., a few minutes to a few hours) while the virtual meeting provider 332 attempts to reconnect to the survivability server 302 and the internal client devices 310 that were disconnected. In examples where multiple external clients 370 are connected to the virtual meeting provider 332, the virtual meeting provider 332 may maintain the meeting while the external clients remain connected. If the external clients 370 disconnect and the survivability servers 302 remain unreachable, the virtual meeting provider 332 may then determine whether to end the meeting or maintain the meeting for a predetermined time period, as discussed above.

At some time after the connection interruption 589, the virtual meeting provider 332 may determine that a connection may be restored to the survivability server 302 and the internal client devices 310. The virtual meeting provider 332 may notify the survivability server 302 that the network connection 320 has been restored and inform the survivability server 302 that the internal client devices 310 may reconnect 594 to the virtual meeting 336. The virtual meeting provider 332 facilitates reconnection 594 for the internal client devices 310 back into the virtual meeting 336. In some examples, the survivability server 302 continues to monitor the network connection 320 to the virtual meeting provider 332 to ensure a stable and improved experience for connected internal client devices 310.

Figure 6:
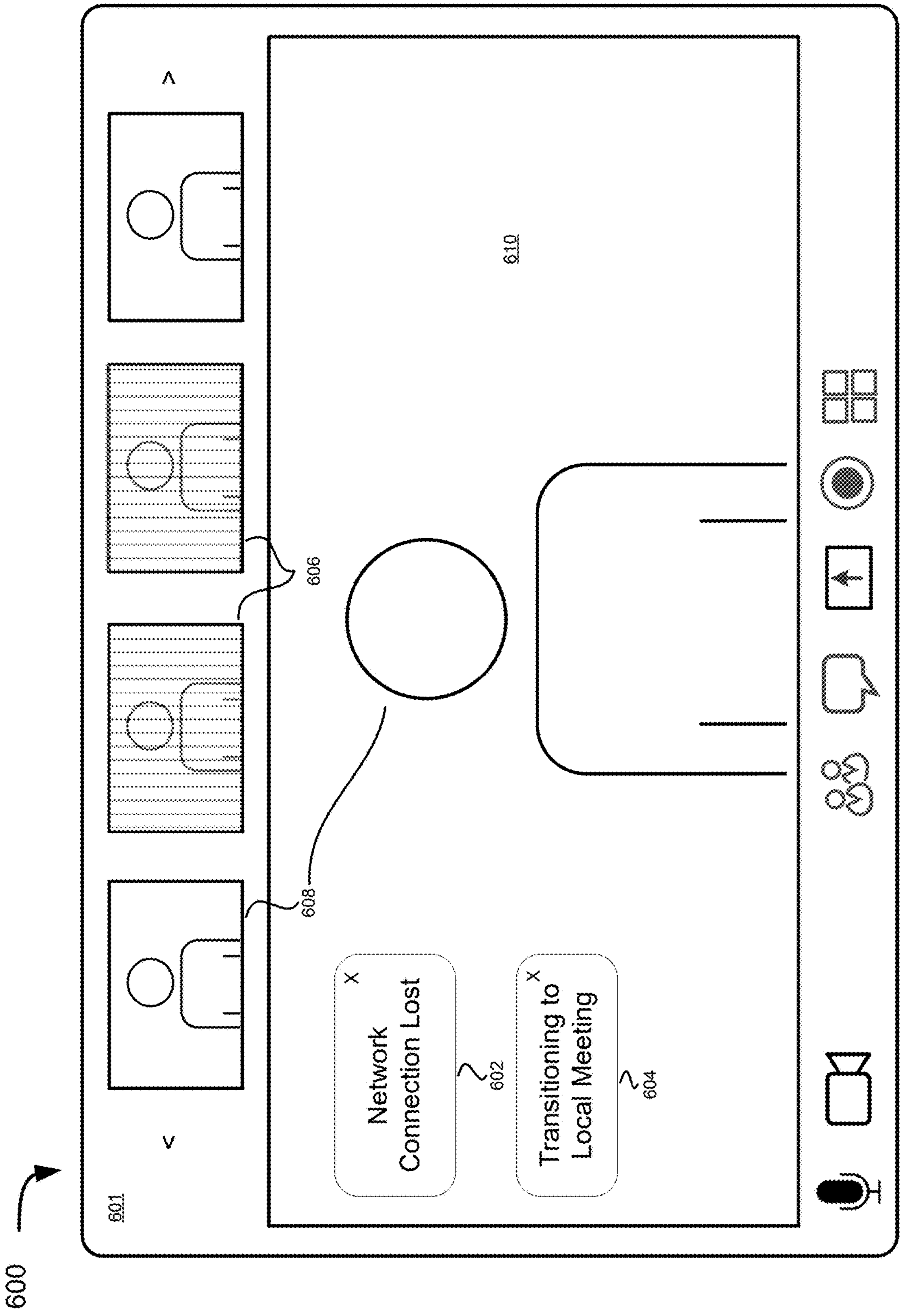
FIGS. 6 and 7 show examples of types of notifications suitable for use with example systems and methods for hybrid in-meeting survivability.

Referring now to FIG. 6, while references will be made to specific components of the examples system shown in FIG. 3, it should be appreciated that the example shown in FIG. 6 is compatible with any example described herein. FIG. 6 shows an example graphical user interface "GUI" 600 suitable for use with example systems and methods for hybrid in-meeting survivability.

FIG. 6 illustrates an example of the GUI 600 displaying a virtual meeting room 601 during a virtual meeting 336 at a time of an interruption event 312. The virtual meeting room 601 can be the same or similar to meeting spaces as discussed in FIGS. 1-3. Various participants 608, using internal client devices 310 or external client devices 370 (not illustrated), may share audiovisual streams with one another via a stream window 610 (e.g., video/audio stream) while the virtual meeting 336 is in-progress.

In some examples, once the virtual meeting 336 is in-progress, the interruption event 312 may disrupt a network connection 320 causing some affected participants 608 to become disconnected. For example, during the virtual meeting 336, a severe storm may cause a network disruption (e.g., packet loss, a flapping connection, or similar) in a specific region (e.g., Atlanta) to cause affected participants 606 to lose connectivity to the virtual meeting 336. During this occurrence, the affected participants 606 that were disconnected may receive a connection notification 602 (e.g., a pop-up notification, a sound, a visual cue or similar) with information about the network disruption.

The connection notification 602 may be displayed to the affected participant 606 along with information related to the interruption event 312. The information may include a possible reason (e.g., "Internet connection lost", "Possible power outage in area", or similar) for the disconnection. In some examples, the connection notification 602 may be joined by an audible chime, a visible screen shake or color change, or a haptic notification such as a device specific function like vibration. The connection notification 602 may be any type of notification to get the affected participants 606 attention.

In addition to the connection notification 602, the GUI 600 may provide an interaction window 604. The interaction window 604 may include information on a state of the virtual meeting 336 such as an imminent transition (e.g., "Transitioning to Local Meeting") or the interaction window 604 may be an interactable prompt such as "Click to transition to Local Meeting". In other examples, the interaction window 604 may include an incremental time (e.g., "Disconnected for three seconds") that increases with time as long as the affected participant 606 is disconnected from the virtual meeting 336. In various examples, a number of other affected participants 606 (e.g., participants that were orphaned along with the affected participant 606) are displayed to the affected participant 606.

In some examples, the interaction window 604 may include options (e.g., a list of interactable items) to enable the affected participant 606 to select whether or not the affected participant 606 would like to continue in a local virtual meeting 306. In other examples, the interaction window 604 provides some affected participant 606 an option to wait until the network connection 320 is restored. In further examples, the interaction window 604 may receive an input from the internal client device 310 to acknowledge a transition from the virtual meeting 336 to the local virtual meeting 306. Additionally, one or more updates may be transmitted to the internal client device 310 on a status of the network connection 320, where the one or more updates include: a timeout period, a number of participants in the local virtual meeting, a number of participants that were not transitioned into the local virtual meeting 306, information related to an interruption event, or any combination thereof.

In some aspects, if the survivability server 302 determines that the network connection 320 cannot be re-established, the interaction window 604 may notify the internal client device 310 that the network connection 320 has timed out. In response, the survivability server 302 may receive input within the interaction window 604 from the internal client device 310 to end the local virtual meeting 306.

In other aspects, the GUI 600 may transition the affected participants 606 substantially seamlessly to avoid a jarring transition or any transition that may be unpleasant for participants interacting in the virtual meeting 336. For example, when the network connection 320 to the virtual meeting 336 is lost, the GUI 600 may only change what is displayed on the stream window 610. In other examples, the stream window 610 may change to another affected participant 606 that was transitioned into the local virtual meeting 306 to ensure the affected participants 606 may continue to interact with one another. In further examples, the GUI 600 may change an aspect of the participants 608 and the affected participants 606 such as a color hue to denote which were disconnected.

Figure 7:
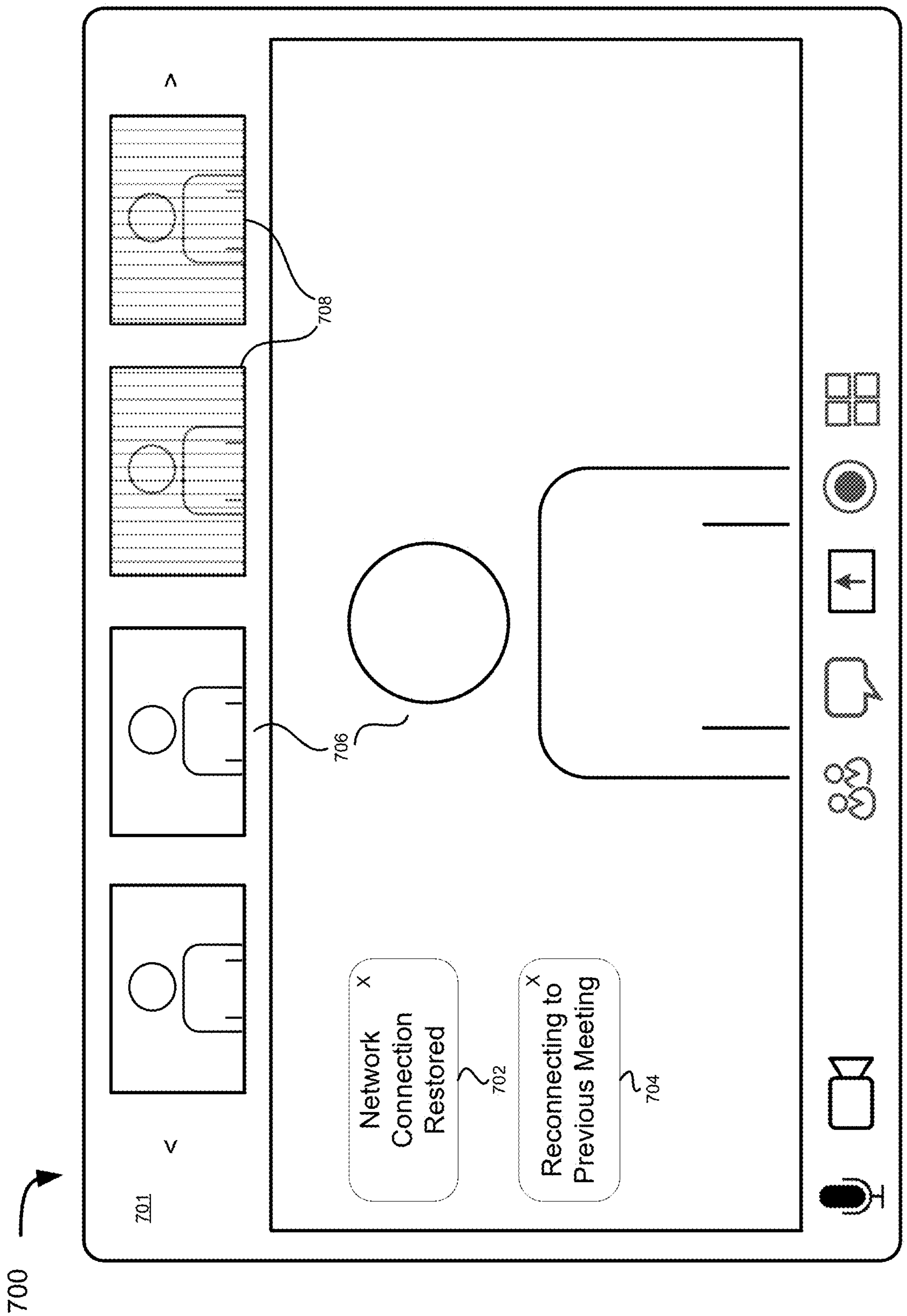

Referring now to FIG. 7, while references will be made to specific components of the examples system shown in FIG. 3, it should be appreciated that the example shown in FIG. 7 is compatible with any example described herein. FIG. 7 shows an example graphical user interface "GUI" 700 suitable for use with example systems and methods for hybrid in-meeting survivability.

FIG. 7 illustrates an example a meeting room 701 during a virtual meeting 336 after a network connection 320 to a virtual meeting provider 332 has been restored. For example, affected participants 706 that are currently interacting in a local virtual meeting 306 after a network connection 320 had been severed may receive a reconnection notification 702 (e.g., pop-up notification, message, or similar) that the network connection 320 has been restored.

The reconnection notification 702 may be displayed to the affected participant 706 along with information related to reconnection to the virtual meeting provider 332. The information may include text to help the affected participant 706 quickly understand that the local virtual meeting 306 is about to end. In some examples, the reconnection notification 702 may be joined by an audible chime, a visible screen shake or color change, or a haptic notification such as a device specific function like vibration. The reconnection notification 702 may be any type of notification to get the affected participants 706 attention.

In addition to the reconnection notification 702, the GUI 700 may provide an interaction window 704. The interaction window 704 may include information on a state of the virtual meeting 336 such as an imminent transition (e.g., "Reconnecting to Previous Meeting" or similar) or the interaction window 704 may be an interactable prompt such as "Click to reconnect to Meeting". In other examples, the interaction window 704 may include a countdown timer (e.g., "Reconnecting in three seconds") that decreases with time prior to reconnecting the affected participant 706 to the virtual meeting 336. In various examples, a number of other participants 708 (e.g., participants that were not orphaned along with the affected participant 706) is displayed to the affected participant 706.

In some examples, the interaction window 704 may include options (e.g., a list of interactable items) to enable the affected participant 706 to select whether or not the affected participant 706 would like to reconnect to the virtual meeting 336. In other examples, the interaction window 704 provides some affected participant 706 an option to delay reconnection to the virtual meeting 336 for a pre-determined time (e.g., delay reconnection for five minutes) or a participant entered time. For example, the affected participant 706 may enter a time (e.g., a few minutes) to extend the local virtual meeting 306 before reconnecting to the virtual meeting 336. In alternate examples, the affected participant 706 may select an option to not rejoin the virtual meeting 336 and to enable the local virtual meeting 306 to continue indefinitely.

Figure 8:
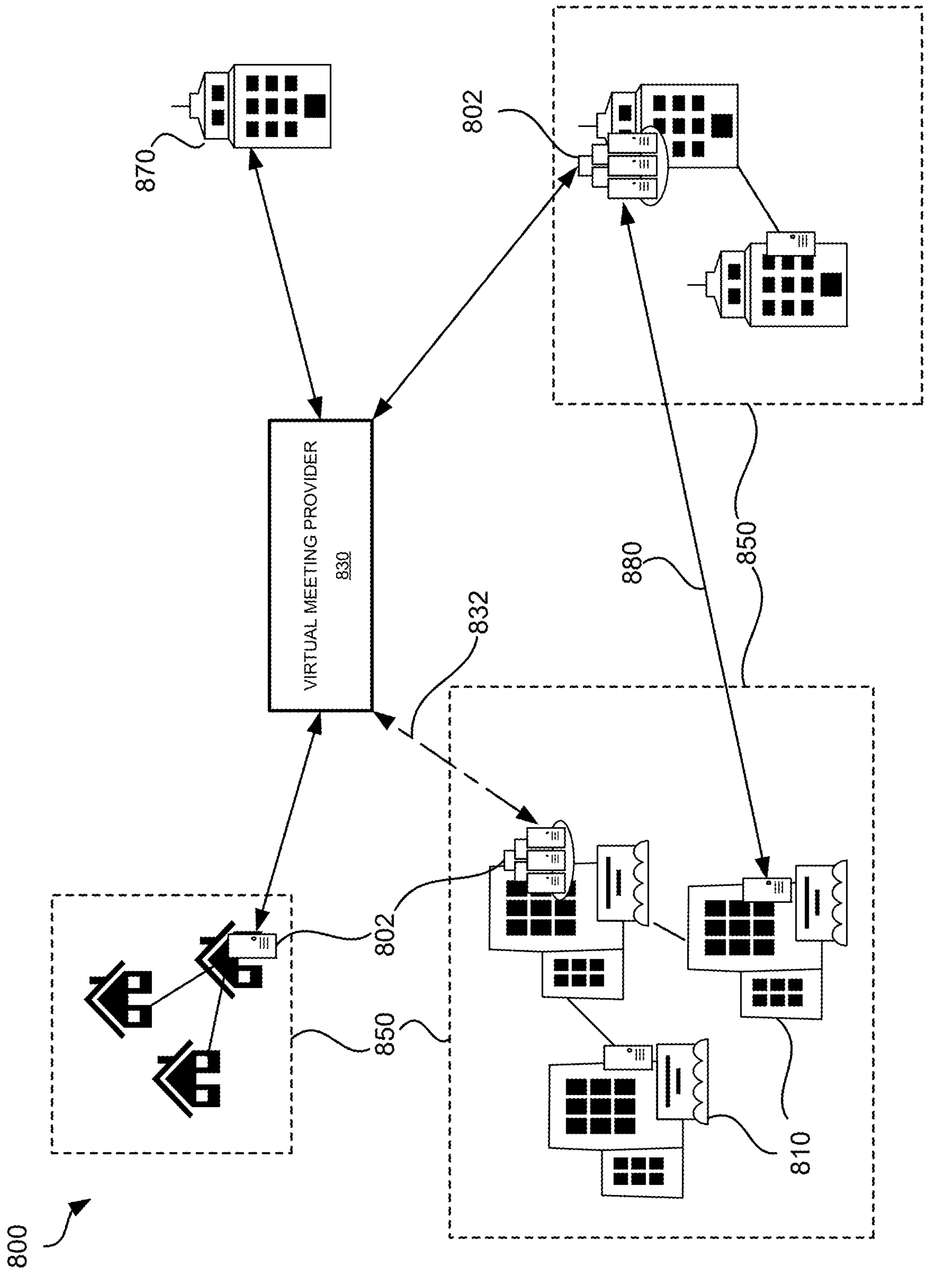
FIG. 8 shows an example network configuration for use with example systems and methods for providing hybrid in-meeting survivability.

Referring now to FIG. 8, while references will be made to specific components of the examples system shown in FIG. 3, it should be appreciated that the example shown in FIG. 7 is compatible with any example described herein. FIG. 7 shows an example survivability network 800 suitable for use with example systems and methods for hybrid in-meeting survivability.

FIG. 8 illustrates the example survivability network 800 includes survivable meeting zones 850 connected to a virtual meeting provider 830. Each survivable meeting zone 850 may represent "in-network" zones that have been previously registered (e.g., have video conference provider specific accounts or subscriptions) with the virtual meeting provider 830. During a virtual meeting 336, the virtual meeting provider 830 communicates with a survivability server 802 installed on premises in a respective survivable meeting zone 850. The survivability server 802 may be installed in a room of a building, an add-on piece of hardware in an existing network infrastructure, or may be a retrofit kit that may easily upgrade existing hardware.

The survivability server 802 may be assigned to a specific survivable meeting zone 850 by the virtual meeting provider 830 or the survivability server 802 may be assigned an identifier (e.g., a region specific code or a client specific identification number) by an installer (e.g., infrastructure technician) of the survivability server 802. In other examples, the survivability server 802 may be grouped with other survivability servers 802 that share the same survivable meeting zone 850 by the virtual meeting provider 830. The survivability servers 802 that are grouped into the same survivable meeting zone 850 may determine an optimal network structure (e.g., daisy chain topology, clusters, or similar) for grouping the internal client devices 810 to ensure optimal survivability during an interruption event 312 that severs the survivable meeting zone 850 from the virtual meeting provider 830.

For example, the survivable meeting zone 850 may have a group (e.g., from a few dozen to a few hundred) of survivability servers 802 that link groups (e.g., hundreds or thousands) of internal client devices 810. Outside of survivable meeting zones 850 and connection to a survivability server 802, external client devices 870 connect independently to the virtual meeting provider 830. Each survivability server 802 may operate independently of each other or in conjunction depending on a scope of the interruption event 312 (e.g., how many internal client devices has been disconnected). As an example, a first group of survivability servers 802 in Los Angeles may communicate with a second group of survivability servers 802 in San Fransisco if it is determined by at least one survivability server 802 that both the first group and the second group have lost connection to the virtual meeting provider 830; but not to each other. Grouping disconnected survivable meeting zones 350 together can help ensure that a maximum number of the internal client devices 810 that have been disconnected from the virtual meeting 336 are able to continue interacting in a local virtual meeting 306 generated by one of the survivability servers 802.

In some examples, during the interruption event 312 the survivability servers 802 may notify the internal client devices 810 in respective survivable meeting zones 850 on availability. For example, the internal client devices 810 may automatically receive a list of available survivability servers 802. In other examples, the internal client devices 810 may transmit status requests to the list of available survivability servers to determine if a connection may be made. In this example, the internal client device 810 may check to see if the survivability servers 802 have enough seats available based on internal client device 310 permissions or whether one of the survivability servers 802 is preferred based on ping or similar metrics related to optimal network connections. The internal client devices 810 may provide information to participants including the list of survivability servers 802 that are available to connect to. The participant may choose to connect (e.g., using a GUI) to a specific survivability server 802 or may choose to have the decision made based on pre-defined characteristics (e.g., a previously connected survivability server 802, a survivability server 802 with plenty of seats available, or similar). Additional information may be provided to the participant including time remaining to make a choice or time remaining before connection to the survivability server 802. In some examples, the internal client devices 810 automatically connect to a pre-defined survivability server 802 and the internal client devices 810 may prompt the participants after connecting to change survivability servers 802.

In other examples, the survivability server 802 determines which internal client devices 810 have appropriate configurations to join the local virtual meeting 306 if network connection 832 is disconnected. For example, the survivability server 802 may check network connections 820 to each internal client device 801 for connection strength (e.g., low latency). In addition, the survivability server 802 may function to transfer only a portion of the internal client devices 810 based on a number of available seats or a physical limitation of the survivability server 802 hardware.

In one example, the survivability server 802 may coordinate other survivability servers 802 located in the same region to optimize network efficiency. In other examples, the survivability server 802 may search for an alternate network path 880 to effectively bypass the network outage. In this instance, the survivability server 802 may continue to host the local virtual meeting 306 until a reliable connection (using methods described above) to the virtual meeting provider 830 over alternate network path 880 can be established.

Figure 9:
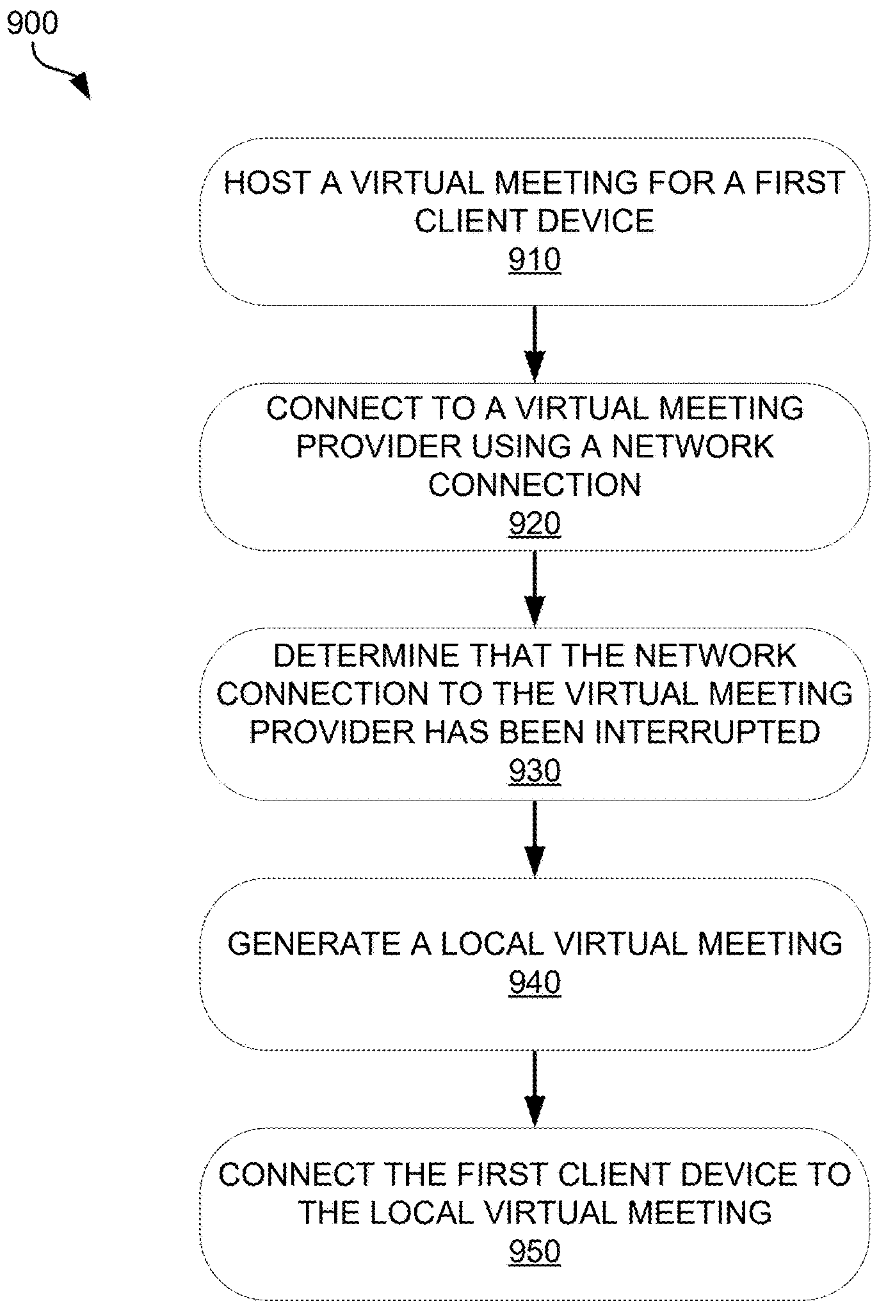
FIG. 9 shows an example method for providing hybrid in-meeting survivability.

Referring now to FIG. 9, FIG. 9 shows an example method 900 for using a hybrid in-meeting survivability server 302. The example method 1200 described herein will be discussed with respect to the example discussed above with respect to FIG. 3; however, it should be appreciated that any suitable systems or methods according to this disclosure may be employed.

At block 910, a survivability server 302 hosts a virtual meeting 336 for a first client device 310. The first client device 310 may include one or more internal client devices 310 that exist on a private network such as a LAN and may be directly connected to the survivability server 302. The internal client devices 310 may be located on premises with the survivability server 302 or may be in a region near the survivability server 302 such that there is a common network between the internal client devices 310 and the survivability server 302.

At block 920, the survivability server 302 connects to a virtual meeting provider 332 using a network connection 320. The network connection 320 facilitates internal client devices 310 interacting with external client devices 370 (e.g., client devices using the Internet as a network of communication) and other internal client devices 310 located in other survivable meeting zones 350 during the hosted meeting. The survivability server 302 may communicate with the virtual meeting provider 332 to host the virtual meeting 336 for all connected parties. Once a connection to the virtual meeting provider 332 exists, the virtual meeting provider 332 may function to operate the virtual meeting 336.

At block 930, the survivability server 302 may determine that the network connection 320 to the virtual meeting provider 332 has been interrupted. In response to the determination, the survivability server 302 may identify a number of the internal client devices 310 that are directly connected to the survivability server 302. In some examples, the survivability server 302 may work with a group of survivability servers 302 that share the same survivable meeting zone 350 in order to support the number of internal client devices 310 that were disconnected.

At block 940, the survivability server 302 generates a local virtual meeting 306 and provides the internal client devices 310 connection information, as described above with respect to FIG. 3, to connect to the local virtual meeting 306 . . . . The local virtual meeting 306 exists substantially simultaneously with the virtual meeting 336. While the local virtual meeting 306 is generated, the survivability server 302 continues to attempt to reconnect to the virtual meeting provider 332 using the network connection 320 or alternate network pathways available to the survivability server 302.

At block 950, the survivability server 302 facilitates connecting internal client devices 310 into the local virtual meeting 306 based on authorizations and permissions as described above in FIG. 3. The local virtual meeting 306 may provide some or all of the same functionality as the virtual meeting 336 for disconnected internal client devices 310. In some examples, the survivability server 302 pushes a notification to the internal client devices 310 notifying participants using the internal client devices 310 of the transition (e.g., pop-up notification, SMS text, or similar). In the instance where a connection to the virtual meeting provider 332 has been determined to be reconnectable, the survivability server 302 may provide information to the internal client devices 310 that reconnection is possible.

For example, once the survivability server 302 has established a stable connection, using techniques described in FIG. 3, the survivability server 302 may transmit connection information to each connected internal client device 310 if the survivability server 302 determines that the original virtual meeting 336 has not ended. The internal client devices 310 may then use the connection information to re-connect to the virtual meeting 336 in order to continue to participate in the original virtual meeting 336.

Figure 10:
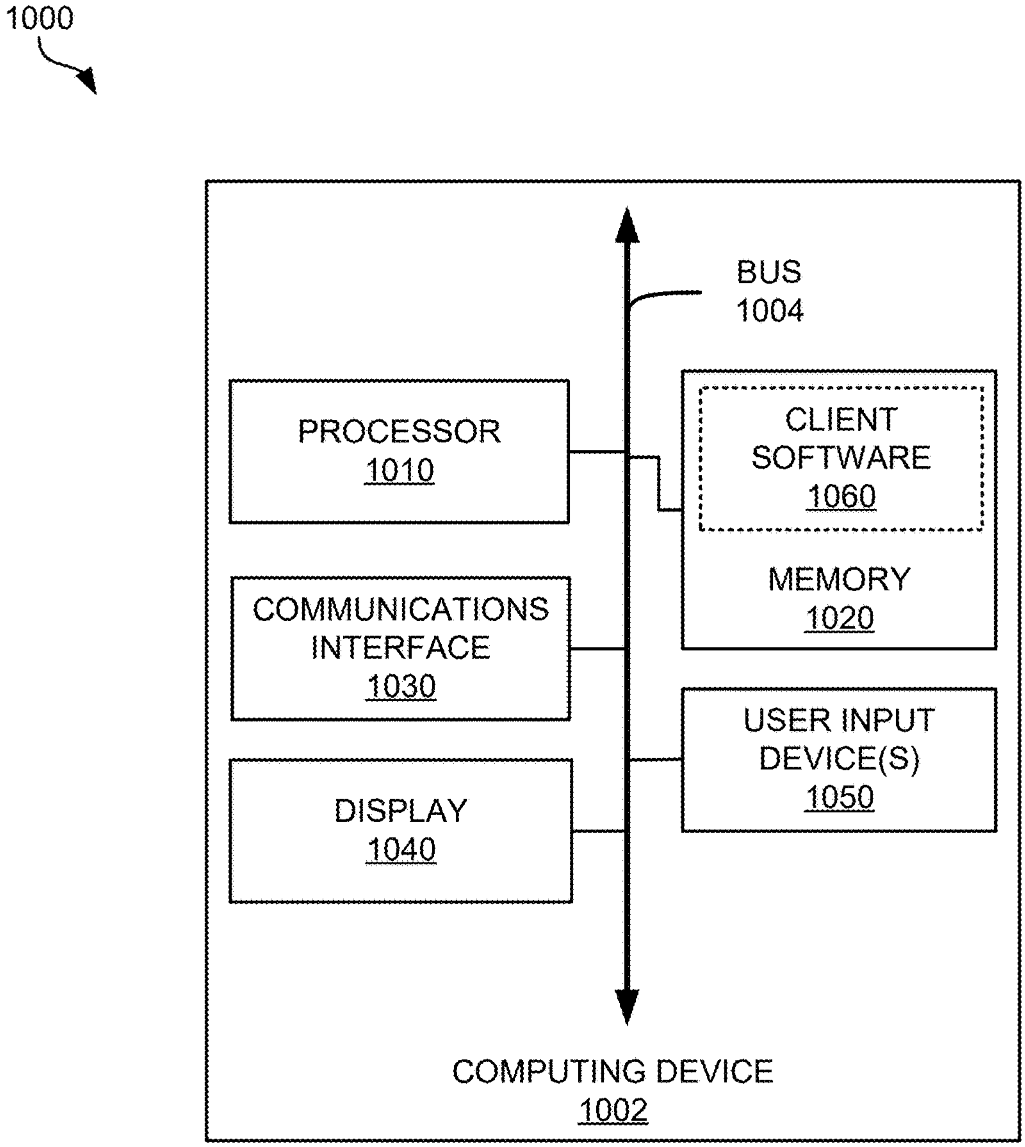
FIG. 10 shows an example computing device suitable for use with example systems and methods for providing hybrid in-meeting survivability.

Referring now to FIG. 10, FIG. 10 shows an example computing device 1000 suitable for use in example systems or methods for using a hybrid in-meeting survivability server according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for using a hybrid in-meeting survivability server according to different examples, such as part or all of the example method 900 described above with respect to FIG. 9. Suitable example computing devices 1000, such as user client devices, may also include one or more user input devices 1050, such as a keyboard, mouse, touchscreen, microphone, etc., to accept user input. The computing device 1000 also includes a display 1040 to provide visual output to a user. In addition, the computing device 1000 includes client software 1060, such as discussed above with respect to FIGS. 3-9.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method for virtual meeting survivability comprising:

hosting, by a survivability server, a virtual meeting, a first client device connected to the virtual meeting;

connecting, by the survivability server, to a virtual meeting provider using a network connection, a second client device connected to the virtual meeting via the virtual meeting provider;

in response to determining that the network connection between the survivability server and the virtual meeting provider has been interrupted, generating, by the survivability server, a local virtual meeting; and connecting, by the survivability server, the first client device to the local virtual meeting.

2. The method of claim 1, wherein the first client device includes a plurality of internal client devices connected to the survivability server directly; and wherein the second client device includes a plurality of external client devices connected to the virtual meeting using the virtual meeting provider; and after connecting to the virtual meeting provider, transmitting, by the survivability server, a first audiovisual signal from the plurality of internal client devices to the virtual meeting provider using the network connection, the first audiovisual signal being relayed to the plurality of external client devices by the virtual meeting provider;

receiving, by the survivability server, a second audiovisual signal from the virtual meeting provider, the second audiovisual signal being associated with the plurality of external client devices; and transmitting, by the survivability server, the second audiovisual signal to the plurality of internal client devices to enable an interaction between the plurality of internal client devices and the plurality of external client devices in the virtual meeting.

3. The method of claim 1, further comprising:

in response to determining that the network connection to the virtual meeting provider can be restored, reconnecting, by the survivability server, to the virtual meeting provider;

determining, by the survivability server, that the virtual meeting has not ended; and reconnecting, by the survivability server, the first client device from the local virtual meeting into the virtual meeting.

4. The method of claim 1, further comprising:

monitoring, by the survivability server, a candidate list of external servers capable of continuing the virtual meeting;

identifying, by the survivability server, a stable connection to an external server within the candidate list of external servers;

connecting, by the survivability server, to the external server;

notifying, by the survivability server, the first client device that the survivability server is going to merge the local virtual meeting into a second virtual meeting; and merging, by the survivability server, the local virtual meeting into the second virtual meeting.

5. The method of claim 4, further comprising:

determining, by the survivability server, that the network connection to the virtual meeting provider is no longer interrupted;

connecting, by the survivability server, to the virtual meeting provider to access the virtual meeting; and merging, by the survivability server, the second virtual meeting with the virtual meeting.

6. The method of claim 1, further comprising:

determining, by the survivability server, that the network connection to the virtual meeting provider is no longer interrupted;

waiting, by the survivability server, a time period to validate that the network connection to the virtual meeting provider is stable based on a timeout threshold;

in response to validating that the network connection is stable:

connecting, by the survivability server, to the virtual meeting provider using the network connection;

determining, by the survivability server, that the virtual meeting has not ended; and merging, by the survivability server, the first client device from the local virtual meeting into the virtual meeting.

7. A survivability server comprising:

a processor; and a memory that includes instructions executable by the processor for causing the process to:

host a virtual meeting, a first client device connected to the virtual meeting;

connect, to a virtual meeting provider using a network connection, a second client device connected to the virtual meeting via the virtual meeting provider;

in response to determining that the network connection between the survivability server and the virtual meeting provider has been interrupted, generate a local virtual meeting; and connect the first client device to the local virtual meeting.

8. The survivability server of claim 7, wherein the first client device includes a plurality of internal client devices connected to the survivability server directly;

and wherein the second client device includes a plurality of external client devices connected to the virtual meeting using the virtual meeting provider; and after connecting to the virtual meeting provider, transmit a first audiovisual signal from the plurality of internal client devices to the virtual meeting provider using the network connection, the first audiovisual signal being relayed to the plurality of external client devices by the virtual meeting provider;

receive a second audiovisual signal from the virtual meeting provider, the second audiovisual signal being associated with the plurality of external client devices; and transmit the second audiovisual signal to the plurality of internal client devices to enable an interaction between the plurality of internal client devices and the plurality of external client devices in the virtual meeting.

9. The survivability server of claim 7, further comprising:

in response to determining that the network connection to the virtual meeting provider can be restored, reconnect to the virtual meeting provider;

determine that the virtual meeting has not ended; and reconnect the first client device from the local virtual meeting into the virtual meeting.

10. The survivability server of claim 7, further comprising:

monitor a candidate list of external servers capable of continuing the virtual meeting;

identify a stable connection to an external server within the candidate list of external servers;

connect to the external server;

notify the first client device that the survivability server is going to merge the local virtual meeting into a second virtual meeting; and merge the local virtual meeting into the second virtual meeting.

11. The survivability server of claim 10, further comprising:

determine that the network connection to the virtual meeting provider is no longer interrupted;

connect to the virtual meeting provider to access the virtual meeting; and merge the second virtual meeting with the virtual meeting.

12. The survivability server of claim 7, further comprising:

determine that the network connection to the virtual meeting provider is no longer interrupted;

wait a time period to validate that the network connection to the virtual meeting provider is stable based on a timeout threshold; and in response to validating that the network connection is stable:

connect to the virtual meeting provider using the network connection;

determine that the virtual meeting has not ended; and merge the first client device from the local virtual meeting into the virtual meeting.

13. The survivability server of claim 7, wherein generating the local virtual meeting further comprises:

notify the first client device that the virtual meeting has been interrupted;

receive an input from the first client device to acknowledge a transition from the virtual meeting into the local virtual meeting; and transmit one or more updates to the first client device on a status of the network connection, the one or more updates including: a timeout period, a number of participants in the local virtual meeting, a number of participants that were not transitioned into the local virtual meeting, information related to an interruption event, or any combination thereof.

14. The survivability server of claim 7, further comprising:

determine that the network connection cannot be re-established;

notify the first client device that the network connection has timed out; and receive input from the first client device to end the local virtual meeting.

15. A non-transitory computer-readable medium comprising instructions that are executable by a processor causing the processor to perform operations comprising:

hosting a virtual meeting, a first client device connected to the virtual meeting;

connecting to a virtual meeting provider using a network connection, a second client device connected to the virtual meeting via the virtual meeting provider;

in response to determining that the network connection to the virtual meeting provider has been interrupted, generating a local virtual meeting; and connecting the first client device to the local virtual meeting.

16. The non-transitory computer-readable medium of claim 15, wherein the first client device includes a plurality of internal client devices;

wherein the second client device includes a plurality of external client devices connected to the virtual meeting using the virtual meeting provider; and after connecting to the virtual meeting provider, transmitting a first audiovisual signal from the plurality of internal client devices to the virtual meeting provider using the network connection, the first audiovisual signal being relayed to the plurality of external client devices by the virtual meeting provider;

receiving a second audiovisual signal from the virtual meeting provider, the second audiovisual signal being associated with the plurality of external client devices; and transmitting the second audiovisual signal to the plurality of internal client devices to enable an interaction between the plurality of internal client devices and the plurality of external client devices in the virtual meeting.

17. The non-transitory computer-readable medium of claim 15, further comprising:

in response to determining that the network connection to the virtual meeting provider can be restored, reconnecting to the virtual meeting provider;

determining that the virtual meeting has not ended; and reconnecting the first client device from the local virtual meeting into the virtual meeting.

18. The non-transitory computer-readable medium of claim 15, further comprising:

monitoring a candidate list of external servers capable of continuing the virtual meeting;

identifying a stable connection to an external server within the candidate list of external servers;

connecting to the external server;

notifying the first client device that the local virtual meeting is going to merge into a second virtual meeting; and merging the local virtual meeting into the second virtual meeting.

19. The non-transitory computer-readable medium of claim 18, further comprising:

determining that the network connection to the virtual meeting provider is no longer interrupted;

connecting to the virtual meeting provider to access the virtual meeting; and merging the second virtual meeting with the virtual meeting.

20. The non-transitory computer-readable medium of claim 15, further comprising:

determining that the network connection to the virtual meeting provider is no longer interrupted;

waiting a time period to validate that the network connection to the virtual meeting provider is stable based on a timeout threshold; and in response to validating that the network connection is stable:

connecting to the virtual meeting provider using the network connection;

determining that the virtual meeting has not ended; and merging the first client device from the local virtual meeting into the virtual meeting.

* * * * *